United States Patent
Carrerot et al.

(10) Patent No.: US 10,584,749 B2
(45) Date of Patent: Mar. 10, 2020

(54) PROCESS FOR MANUFACTURING A HOLLOW ROLLER AND ROLLER BEARING INCLUDING SUCH A ROLLER

(71) Applicant: Aktiebolaget SKF, Göteborg (SE)

(72) Inventors: Herve Carrerot, Vicq (FR); Jacky Jorgowsky, Marly (FR)

(73) Assignee: Aktiebolaget SKF, Gothenburg (SE)

( * ) Notice: Subject to any disclaimer, the term of this patent is extended or adjusted under 35 U.S.C. 154(b) by 65 days.

(21) Appl. No.: 15/833,463

(22) Filed: Dec. 6, 2017

(65) Prior Publication Data

US 2018/0094674 A1   Apr. 5, 2018

Related U.S. Application Data

(63) Continuation of application No. 14/754,949, filed on Jun. 30, 2015, now abandoned.

(30) Foreign Application Priority Data

Jun. 30, 2014   (EP) ..................................... 14306048

(51) Int. Cl.
*F16C 33/34* (2006.01)
*B23B 5/08* (2006.01)
(Continued)

(52) U.S. Cl.
CPC ................ *F16C 33/34* (2013.01); *B23B 1/00* (2013.01); *B23B 5/08* (2013.01); *B23P 15/003* (2013.01);
(Continued)

(58) Field of Classification Search
CPC ............. Y10T 29/5109; Y10T 29/5114; Y10T 29/49693; Y10T 29/49679; B23B 3/065;
(Continued)

(56) References Cited

U.S. PATENT DOCUMENTS

| 493,008 A | * | 3/1893 | Beardsley | ............... B23B 49/04 29/27 B |
| 613,598 A | * | 11/1898 | Pearson | ................... B23B 49/04 29/27 B |

(Continued)

FOREIGN PATENT DOCUMENTS

| DE | 19526900 A1 | 1/1997 |
| EP | 2305403 A1 | 4/2011 |

(Continued)

*Primary Examiner* — Jason L Vaughan
(74) *Attorney, Agent, or Firm* — Allen D. Hertz, P.A.; Allen D. Hertz

(57) ABSTRACT

A process for manufacturing a hollow roller of a roller bearing including steps of: machining an outer radial cylindrical surface, with a circular cross section centered on a first axis, and machining an inner radial cylindrical surface with a circular cross section centered on a second axis. These two steps are realized on the same lathe. The hollow roller is provided with the outer radial cylindrical surface, with a diameter of at least 5 mm, and the inner radial cylindrical surface. An offset between the first axis and the second axis, measured in the hollow roller between two axial surfaces of the hollow roller, is less than 2 μm, and an inclination angle between the first axis and the second axis is less than one minute of angle. The roller bearing comprises amongst others, at least one such hollow roller.

17 Claims, 3 Drawing Sheets

(51) Int. Cl.
   *B24B 5/01* (2006.01)
   *B23B 1/00* (2006.01)
   *B23P 15/00* (2006.01)

(52) U.S. Cl.
   CPC ............ B24B 5/01 (2013.01); *F16C 2220/62* (2013.01); *F16C 2220/70* (2013.01); *F16C 2240/30* (2013.01); *F16C 2240/56* (2013.01); *Y10T 29/49679* (2015.01); *Y10T 29/49693* (2015.01)

(58) Field of Classification Search
   CPC .... B23B 5/14; B23B 5/26; B23B 1/00; B23B 2221/72; B23D 21/04
   USPC ............................ 29/27 R, 27 C, 33 D, 33 T
   See application file for complete search history.

(56) References Cited

U.S. PATENT DOCUMENTS

| | | | | |
|---|---|---|---|---|
| 1,618,541 A * | 2/1927 | Long | ...................... | B23D 21/00 144/4 |
| 1,799,384 A * | 4/1931 | Millspaugh | ............. | B23B 41/12 29/27 B |
| 3,101,019 A * | 8/1963 | Le Lan | ................. | B23B 13/021 82/127 |
| 3,343,243 A * | 9/1967 | Renker | .................... | B23Q 5/34 29/27 R |
| 3,410,618 A | 11/1968 | Harris et al. | | |
| 3,710,466 A * | 1/1973 | Williamson | .............. | B23B 3/00 29/27 R |
| 3,765,071 A * | 10/1973 | Bowen | .................... | F16C 19/26 29/898.062 |
| 4,054,975 A * | 10/1977 | Lundstrom | ............. | B23B 3/161 29/27 C |
| 4,126,064 A | 11/1978 | Tarrant | | |
| 4,180,894 A * | 1/1980 | Link | ........................ | B23B 3/161 29/27 C |
| 4,295,397 A * | 10/1981 | Schweer | .................... | B23B 5/12 82/130 |
| 4,552,047 A * | 11/1985 | Stroup | .................... | B23D 21/04 82/102 |
| 4,777,713 A * | 10/1988 | Kitamura | ................. | B23B 3/065 29/27 C |
| 5,033,877 A * | 7/1991 | Bowen | ...................... | F16C 19/26 384/567 |
| 5,157,824 A * | 10/1992 | Kojima Hiroshi | ........ | B23B 3/06 29/27 R |
| 5,168,609 A * | 12/1992 | Kojima | ..................... | B23B 3/06 29/27 R |
| 5,267,381 A * | 12/1993 | Wright | ...................... | B23B 5/14 29/33 T |
| 5,282,300 A * | 2/1994 | Girny | .................... | B23Q 39/048 29/27 C |
| 5,307,549 A * | 5/1994 | Tsutsumi | .............. | G05B 19/186 29/27 C |
| 5,946,992 A * | 9/1999 | Ozawa | ................... | B23Q 39/026 82/118 |
| 5,964,016 A * | 10/1999 | Ito | .............................. | B23C 3/18 279/14 |
| 6,836,941 B2 * | 1/2005 | Prust | ...................... | B23Q 1/623 29/27 C |
| 6,938,313 B2 * | 9/2005 | Viola | ..................... | B23B 31/202 29/27 C |
| 7,216,407 B2 * | 5/2007 | Yonemaru | ................. | B23B 5/48 29/27 C |
| 8,210,754 B2 | 7/2012 | Endres et al. | | |
| 8,328,429 B2 | 12/2012 | Endres et al. | | |
| 2003/0182782 A1* | 10/2003 | Hessbruggen | ......... | B23Q 1/012 29/27 C |
| 2011/0091145 A1 | 4/2011 | Ito | | |
| 2013/0340242 A1* | 12/2013 | Schuster | ................ | B23Q 7/045 29/559 |

FOREIGN PATENT DOCUMENTS

| | | |
|---|---|---|
| FR | 946559 A | 6/1949 |
| FR | 1375875 A | 10/1964 |
| GB | 1450124 A | 9/1976 |
| JP | 2003103402 A | 4/2003 |

* cited by examiner

PROCESS FOR MANUFACTURING A HOLLOW ROLLER AND ROLLER BEARING INCLUDING SUCH A ROLLER

CROSS REFERENCE TO RELATED APPLICATIONS

The present application is a continuation of U.S. patent application Ser. No. 14/754,949, filed Jun. 30, 2015, which application claims the benefit of Europe Patent (EP) Application Number 14306048.1 filed on 30 Jun. 2014 (30.06.2014), which is incorporated herein by reference in its entirety.

TECHNICAL FIELD OF THE INVENTION

The present invention relates to a process for manufacturing a hollow roller of a roller bearing which can be used, for instance, in an aircraft where lightness and non-skidding of a bearing are essential. This invention also relates to a hollow roller for a roller bearing and to a roller bearing including, amongst others, such a hollow roller.

In the meaning of the present invention, a roller is a cylindrical part which can have a small diameter. Such a small diameter roller is sometime called "needle" and is also concerned by the present invention.

BACKGROUND ART OF THE INVENTION

In the field of aircrafts, for instance helicopters, it is known to use hollow rollers to improve the lightness of a piece of equipment, such as a gearbox, and to lower the risks of skidding between the outer surface of a roller and the corresponding raceway of a bearing ring.

U.S. Pat. No. 3,410,618 discloses an anti-skid bearing where hollow rollers are used with a hollowness range between 60% and 70%. U.S. Pat. Nos. 8,210,754 and 8,328,429 disclose radial roller bearings having massive rollers to sustain a load and hollow rollers to avoid slippage or skidding between rollers and raceways of the rings of the bearing.

Known hollow rollers are generally manufactured by forging.

A key feature of a hollow roller is the coaxiality between its inner and outer radial surfaces. Actually, when a bearing rotates at a speed of about 30,000 rpm, its rollers rotate at a much higher speed, in the range of 300,000 rpm. Thus, if the inner and outer surfaces of a hollow roller are not precisely centered on a common axis, there exists a risk of unbalance of the roller which might destroy it or damage the rings raceways, in case of high rotation speed of the bearing.

Similar problems might occur with roller bearings including hollow rollers in other technical field, outside the aerospace domain.

SUMMARY OF THE INVENTION

One object of this invention is to provide a process for manufacturing a hollow roller of a roller bearing in an efficient way which guarantees that the geometry of the hollow roller is satisfactory, to the point that this roller can be used in a high speed bearing, without a risk of breaking or damaging adjacent raceways.

To this end, the invention concerns a process for manufacturing a hollow roller of a roller bearing, this process including at least the following steps: a) machining an outer radial cylindrical surface, with a circular cross section centered on a first axis, and b) machining an inner radial cylindrical surface, with a circular cross section centered on a second axis. According to the invention, steps a) and b) are realized on the same lathe.

Thanks to the invention, since steps a) and b) are realized in the same machine, a precise respective centering of the outer and inner radial cylindrical surfaces can be obtained. Thus, the balance of the hollow roller can be guaranteed to a large extent, which improves the lifetime of a roller bearing equipped with such a hollow roller. Owing to the concentricity of the outer and inner radial surfaces, the hollowness rate of the hollow roller does not negatively affect its functionality. Thus, a high hollowness rate can be considered, which allows obtaining a light hollow roller. This is particularly interesting for some applications, such as for roller bearings mounted onboard aircrafts, where weight is a key feature.

According to further aspects of the invention which are advantageous but not compulsory, such a process might incorporate one or several of the following features taken in any admissible configuration:

- One uses a first mandrel for holding a part in the lathe during steps a) and b) whereas the first mandrel remains locked on the part between steps a) and b).
- The first mandrel has a central opening through which a single part goes for manufacturing successive hollow rollers.
- Steps a) and b) are each performed by a movement of at least one tool along a longitudinal axis of the lathe.
- The tool used for step a) is a cutting insert,
- The tool used for step b) is a drill and/or a reamer.
- Steps a) and b) are performed one after the other. Alternatively, steps a) and b) are performed simultaneously.
- The process includes at least a step, following steps a) and b) and consisting in: c) separating a preform of the hollow roller form a part.
- Step c) is performed in the lathe.
- A second mandrel, different from the first mandrel, is used for holding the machined preform during step c).
- The process includes at least some of the following steps, performed after step c) and consisting in:
    - d) grinding the outer cylindrical surface on a centerless machining equipment,
    - e) grinding axial surfaces of the roller,
    - f) grinding connecting or corner radii between axial and radial surfaces of the hollow roller,
    - g) grinding a draught zone or crown between the outer radial cylindrical surface and a zone including a connecting radius.

The invention also relates to a hollow roller of a roller bearing, the hollow roller being provided with an outer radial cylindrical surface, with a circular cross-section centered on a first axis and a diameter of at least five millimeters, and an inner radial cylindrical surface, with a circular cross-section centered on a second axis. According to the invention, an offset between the first axis and the second axis, measured between two axial surfaces of the hollow roller, is less than two micrometers (µm) and an inclination angle between the first axis and the second axis is less than one minute of angle.

According to an optional aspect of the invention, the hollow roller has a hollowness rate above 75%, preferably above 78%.

One can also provide that the hollow roller includes at least one draught zone between the outer radial cylindrical surface and a zone including a connecting radius with an axial surface of the roller, whereas the draught zone converges towards the axial surface.

Finally, the invention concerns a roller bearing comprising an inner ring, an outer ring, at least one row of rollers installed in a rolling chamber between the inner ring and the outer ring. According to the invention, at least one of these rollers, preferably anyone of them, is as mentioned here-above for the hollow roller.

BRIEF DESCRIPTION OF THE DRAWINGS

The invention and its advantages will be well understood on the basis of the following description, which is given as an illustrative example, without restricting the scope of the invention and in relation with the annexed drawings. In the drawings.

DETAILED DESCRIPTION OF SOME EMBODIMENTS

Figure 1:
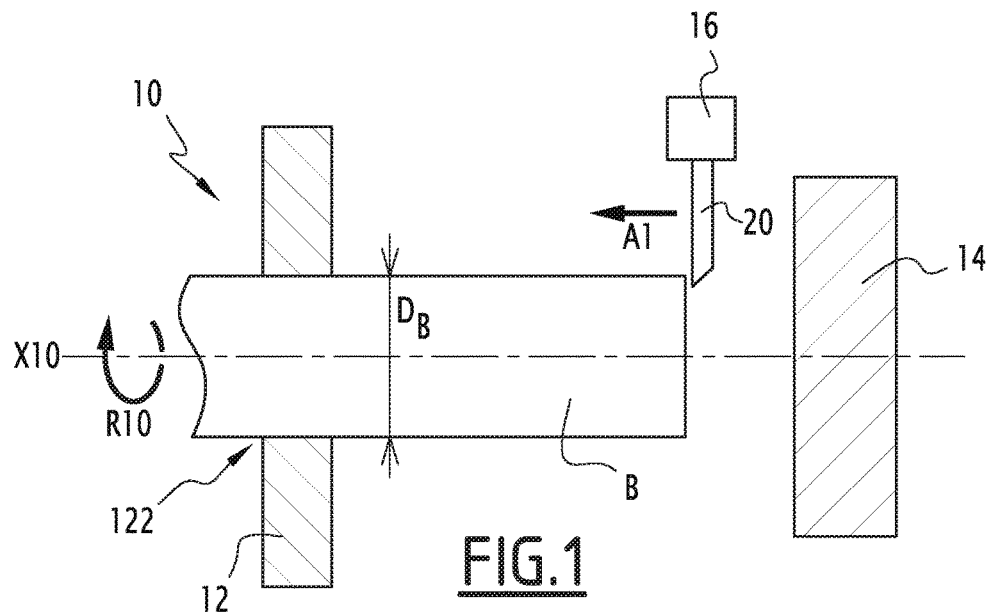
FIG. 1 is a schematic representation of a step of a manufacturing process according to the invention, implemented in a lathe.

FIGS. 1 to 4 partially show a lathe 10 which includes, amongst others, a first mandrel 12 and a second mandrel 14. Mandrel 12 defines a through opening 122 which can be locked around a metal bar B when such a bar is to be held in position within lathe 10. Mandrel 12 defines a central axis X10 of lathe 10 and bar B is at least approximately centered on axis X10 when it is held in position by mandrel 12. Non represented driving means are used to drive mandrel 12 in rotation around axis X10, which allows rotating bar B around axis X10, as shown by rotation arrow R10 on FIG. 1.

Lathe 10 also includes a holder 16 adapted to hold a cutting insert or tool bit 20 for machining an outer radial surface of bar B.

With this respect, in the present description, a direction is the to be axial when it is parallel to axis X10 and radial when it is perpendicular to and secant with axis X10. A surface is axial when it is perpendicular to an axial direction and radial when it is perpendicular to a radial direction.

A first step of a manufacturing process according to the invention consists in purchasing bar B and installing it within opening 122 of mandrel 12. The outer radial surface of bar B can be grounded or not. This has no real impact on the quality of the finally obtained hollow roller, as explained here-after. This bar can be checked by eddy current or by ultra sounds. However, this is not compulsory.

Once bar B has been installed in opening 122 and mandrel 12 has been locked around bar B, bar B is rotated by mandrel 12 as shown by arrow R10 and cutting insert 20 is moved along a direction parallel to axis X10, as shown by arrow A1 on FIG. 1. This results in machining an outer radial surface SO on bar B, this surface being cylindrical, with a circular cross section precisely centered on axis X10 and having a diameter DO which is smaller than the original diameter DB of bar B. The axial length LO of surface SO is chosen slightly larger than the axial length of a roller to be manufactured. In this second step of the process of the invention, which is represented on FIG. 1 and identified as "step a)", mandrel 14 is not used.

XO denotes the central axis of outer surface SO. It is superimposed with axis X10, but for the tolerances within lathe 10.

Figure 2:
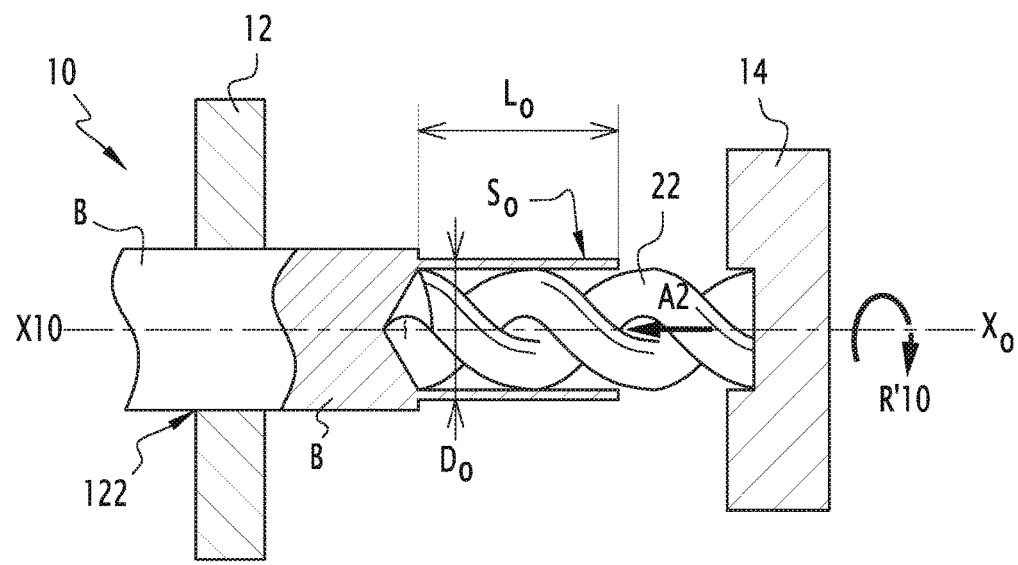
FIGS. 2, 3, and 4 are schematic representations corresponding to FIG. 1 respectively for further steps of the manufacturing process.
Figure 3:
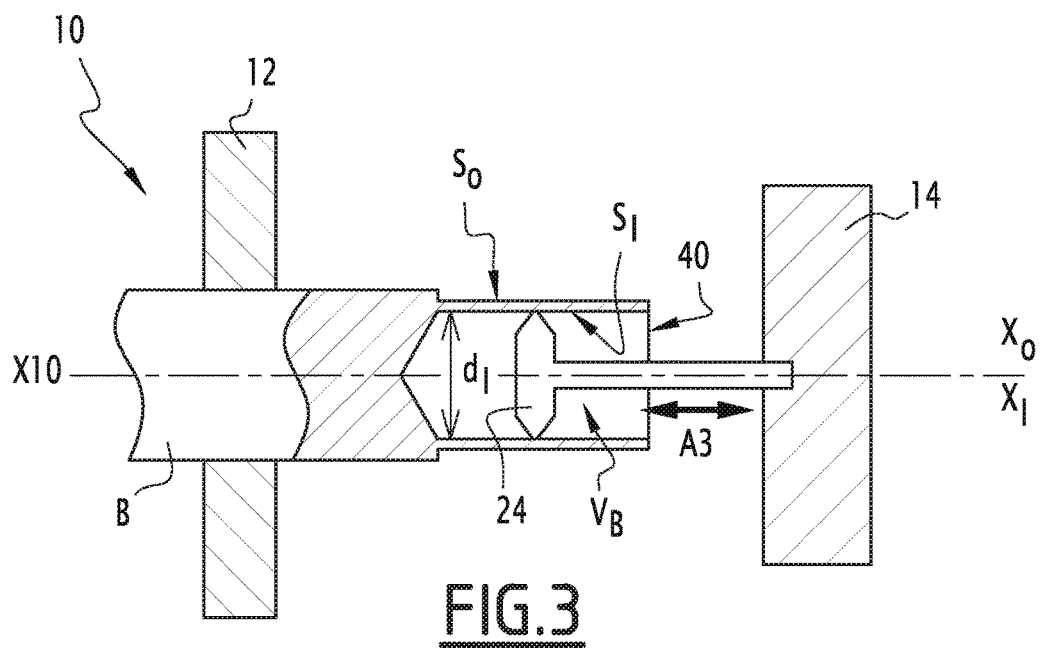
Figure 4:
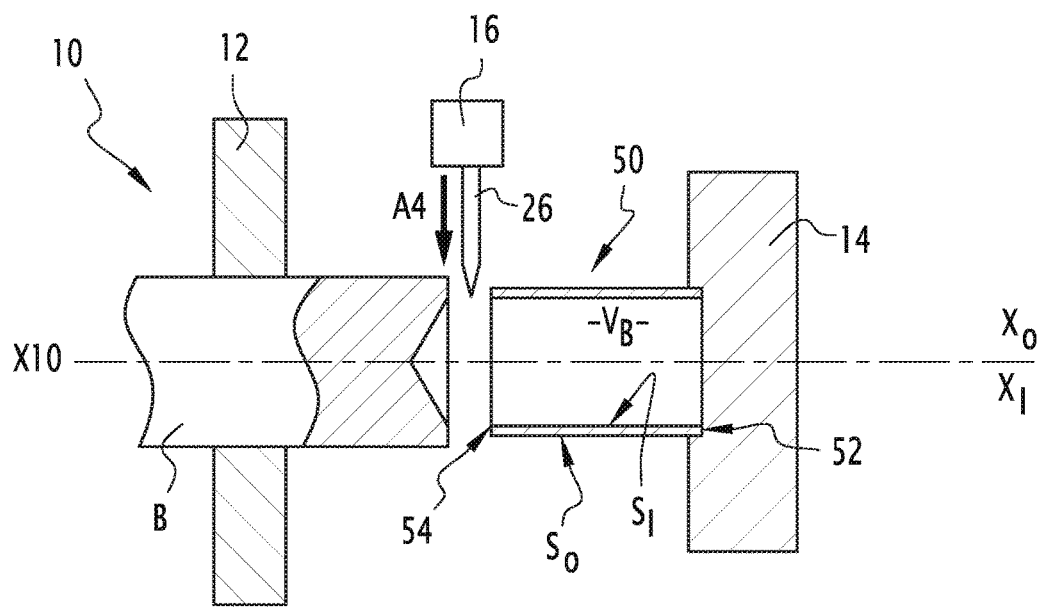

On FIGS. 2 to 4, bar B is represented partly cut-away in order to show the pieces located radially inside surface S0.

In the elementary step of the process of the invention represented on FIG. 2, bar B is still held in position with respect to axis X10 by mandrel 12. In other words, mandrel 12 remains locked around bar B between the configuration of FIG. 1 and the configuration of FIG. 2. Here, mandrel 12 does not rotate. On the other hand, a drill 22 is mounted on mandrel 14 which is driven in rotation around axis X10, as shown by arrow R'10. This rotation movement of mandrel 14 is transmitted to drill 22 which drills bar B along axis X10. Actually, when it is rotated by mandrel 14, drill 22 is also pushed towards mandrel 12, in the direction of arrow A2.

The drilling operation conducted at FIG. 2 involves the creation of a hollow volume VB within bar B, radially inside outer surface SO and along its whole axial length LO.

In a further elementary step represented on FIG. 3, a reamer is mounted on mandrel 14 and moved axially, as shown by double arrow A3, in order to precisely set the concentricity of an inner radial surface SI defined by reamer 24 with respect to axis X10. XI denotes the central axis of inner radial surface SI. Axis XI is superimposed with axis X10 and XO, but for the position tolerances of mandrels 12 and 14 within lathe 10.

In the configuration of FIG. 3, bar B is still held in position with respect to axis X10 by mandrel 12. In other words, mandrel 12 remains locked around bar B between the configuration of FIG. 2 and the configuration of FIG. 3.

In the elementary steps of FIG. 3, reamer 24 is also used to improve the surface roughness of surface SI.

Thus, the process of the invention includes a further step b) which is divided into:

a first elementary step b1) represented on FIG. 2 where some material is removed from bar B, in order to create hollow volume VB, a second elementary step b2) represented on FIG. 3 where the concentricity of inner surface SI on axis X10 and its surface roughness are improved.

dI denotes the inner diameter of surface SI.

Once steps a) and b) have been performed as explained here-above with respect to FIGS. 1, 2 and 3, one comes to a further step c) represented on FIG. 4 where a free end 40 of bar B, through which volume VB has been created, is held by mandrel 14. A cutting tool 26 is moved along a radial direction with respect to axis X10, as shown by arrow A4, in order to cut bar B and to separate a preform 50 of a hollow roller from the remaining portion of bar B.

This preform is still aligned on axis X10, with its respective axes XO and XI superimposed with axis X10.

Mandrel 12 remains locked on bar B from the configuration of FIG. 1 to the configuration of FIG. 4. It is then opened to allow bar B to move to the right and reach again the position of FIG. 1. Then steps a) and b) are implemented again. Thus, several hollow rollers are obtained from bar B.

Figure 5:
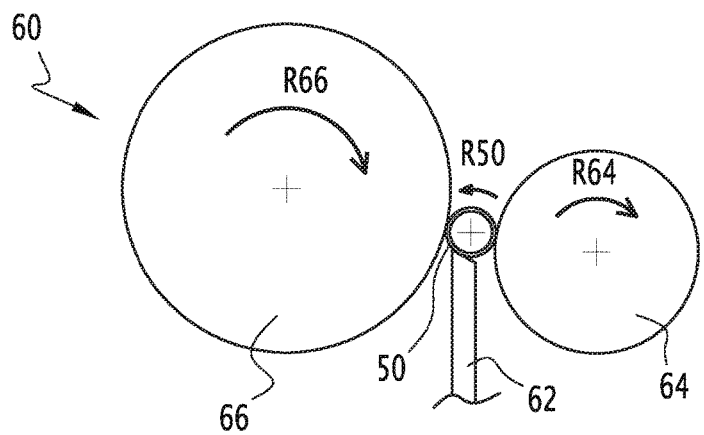
FIG. 5 is a schematic representation of a still further step of the invention; at a smaller scale than FIGS. 1 to 4.

From the configuration of FIG. 4 and as shown on FIG. 5, preform 50 is loaded on a centerless grinding machine 60 where preform 50 stays on a support member 62 and is driven by an elastomer driving wheel 64 in front of a grinder 66. Items 50, 64 and 66 are in contact and rotate together as shown by arrows R50, R64 and R66. In this step d), the outer radial cylindrical surface SO is grounded, which allows obtaining a surface roughness of the same level as the one of a massive roller.

After or before the step d), and in a further step e), some axial surfaces 52 and 54 of preform 50 are also grounded on a corresponding grinding machine. This is known per se and, therefore, non represented.

Thereafter, a zone Z1 with a connecting radius RC is created in a step f) between outer radial surface SO and each axial surface 52 or 54. Radii RC are sometimes called "corner radii". Actually, starting from one axial surface 52 or 54 and going towards surface SO along axes XI and XO, zone Z1 forms a rounded edge.

A second zone Z2 adjacent to each zone Z1 includes a draught surface SD which is frustro-conical and converges toward axis XI and XO in the direction of zone Z1. This draught surface SD, which is grounded in a further step g), avoids blocking of the hollow roller 100 represented on FIGS. 6 and 7 when it rotates between raceways respectively provided on the inner and outer rings of a roller bearing. The advantage of the draught zone Z2, which is also called "draught crown", is to avoid the concentration of stresses at both ends of the roller. On FIG. 7, the conicity angle of surface SO is exaggerated in order to better differentiate it from surface SO.

Figure 6:
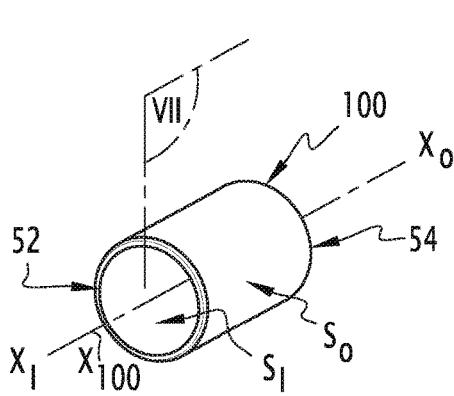
FIG. 6 is a isometric view of a hollow roller according to the invention.
Figure 7:
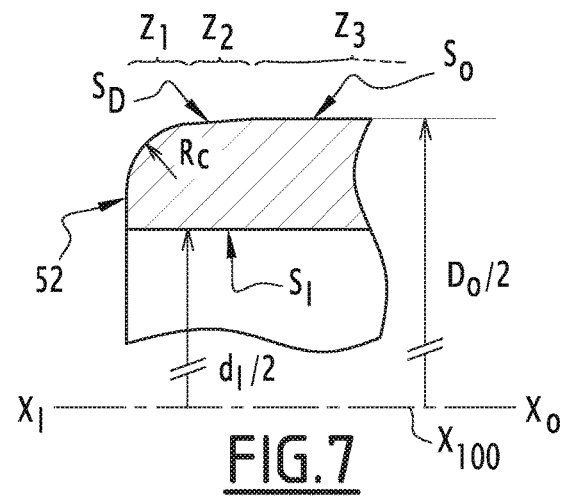
FIG. 7 is a partial cut view along plane VII on FIG. 6.

When surfaces SO, SI, SD and connecting radius RC have been created, one obtains the hollow roller 100 represented on FIGS. 6 and 7.

In a central zone Z3 of hollow roller 100, its outer radial surface SO is cylindrical with a circular cross-section which is the result of steps a) and c) mentioned here-above. In this zone, the diameter of surface SO is DO, but for a potential reduction due to step c).

Thanks to the process represented on FIGS. 1 to 5 and explained here-above, axes XI and XO can be considered to be superimposed or to form bunk axes. Actually, the tolerances in lathe 10 are such that, for a hollow roller 100 with an outer diameter DO larger than 5 mm, preferably larger than 9 mm, and smaller than 50 mm a potential offset between axes XI and XO measured within hollow roller 100, between axial surfaces 52 and 54, is smaller than or equal to 2 μm.

Moreover, if one considers that these two axes can be non-strictly parallel, then, an inclination angle between these two axes is less than one minute of angle.

Because of the high preciseness level of the alignment or superimposition of axes XO and XI together, which is obtained with the process of the invention, the radial thickness of hollow roller 100, defined as the difference between the inner radius dI/2 and the outer radius DO/2 of hollow roller 100 is, small enough to obtain a very light hollow roller. For instance, for a hollow roller with an outer diameter DO larger than or equal to 5 mm, this radial thickness can be less than or equal to 1 mm.

The inner section area or "ISA" of hollow roller 100 equals $\pi*dI2/4$. The outer surface area or OSA of hollow roller 100 equals $\pi*DO2/4$. OSA/ISA defines the hollowness rate of hollow roller 100. Thanks to the invention and because of the precision of the superimposition of axes XI and XO, the hollowness rate of roller 100 is above 75%, preferably above 78%, which does not negatively affect the geometry and balance of hollow roller 100 around its central axis X100 which is, in practice, superimposed with axes XO and XI.

Figure 8:
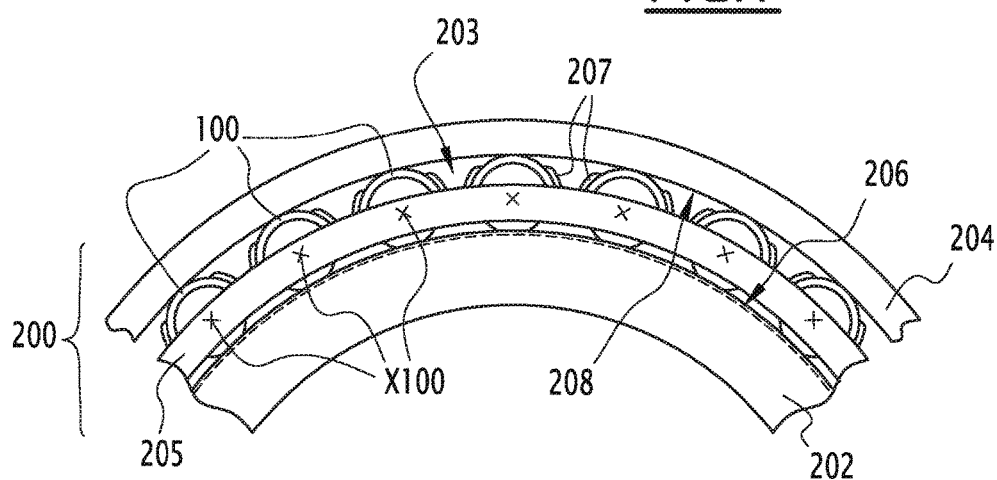
FIG. 8 is a partial front view of a roller bearing according to the invention where rollers similar to the one of FIG. 6 are used.

A shown on FIG. 8, a roller bearing 200 according to the invention includes an inner ring 202 and an outer ring 204 which respectively defines an inner raceway 206 and an outer raceway 208 centered on a common axis X200. A row of hollow rollers 100 is installed in a rolling chamber 203 defined, radially with respect to axis X200, between raceways 206 and 208 and kept in position by a cage 205 and some holders 207. Such a roller bearing is centered on an axis X200 which is parallel to the respective axes X100 of the hollow rollers 100.

According to alternative embodiments of the invention, roller bearing 200 can include several rows of hollow rollers 100 or some of its rollers mays be plain or massive rollers.

Roller bearing 200 can be used in a gear box of a helicopter. However, other applications of the invention can be considered, for instance, still in the aerospace field, for an engine main shaft.

Bar B is made of steel or another metal. Alternatively, it can be made of a synthetic or composite material, or mineral material.

According to a non-represented aspect of the invention which is known per se, a local or global heat treatment can be used for hardening at least some of the surfaces of hollow roller 100, after steps a), b) and c), including surfaces SO, 52 and 54.

According to a non-represented embodiment of the invention, and provided that a proper tool is used with portions adapted to cut bar B and drill it, steps a) and b) can be performed simultaneously.

The embodiments and variants considered here-above can be combined in order to generate further embodiments of the invention.

The invention claimed is:

1. A process comprising:
   mounting a rod in a first rotatable chuck of a lathe;
   machining an outer cylindrical surface of the rod such that the rod has a circular cylindrical cross section centered on a first axis;
   without removing the rod from the first chuck, using a drill attached to a second rotatable chuck of the lathe to drill into an axial end face of the rod to form an inner radial cylindrical surface with a circular cross section centered on a second axis, the second axis being offset from the first axis by less than 2 pm,
   after using the drill to drill into the axial end face of the rod, and without removing the rod from the first chuck, using a reamer attached to the lathe to ream the inner radial cylindrical surface,
   without removing the rod from the first chuck, holding the rod with the second chuck and, while holding the rod with the first chuck and the second chuck, separating the machined portion of the rod from an unmachined portion of the part to form a hollow roller of a roller bearing, and
   wherein the drilling occurs over a distance from the axial end face of the rod, wherein the outer cylindrical surface is machined over the distance from the axial end face of the rod such that the cross section centered on the first axis is substantially constant along the distance and wherein the separating occurs at a location such that the hollow roller has a constant inner diameter.

2. The process according to claim 1, wherein the first axis is an axis of rotation of the first chuck and the second axis is an axis of rotation of the second chuck.

3. The process according to claim 1, wherein the machining of the outer surface of the rod and the machining of the inner surface of the rod are performed such that the hollow roller has a hollowness rate above 78%.

4. The process according to claim 3, wherein an inclination angle between the first axis and the second axis is less than one minute of angle.

5. The process according to claim 4, including installing the hollow roller and a plurality of roller elements between a bearing inner ring and a bearing outer ring to form the roller bearing.

6. A process comprising:
providing a lathe having a first holder having a first axis of rotation and a second holder facing the first holder and having a second axis of rotation, the first axis of rotation being offset from the second axis of rotation by less than 2 pm and an inclination angle between the first axis of rotation and the second axis of rotation being less than one minute of angle;
placing a rod in the first holder and machining an outer surface of the rod to form a cylindrical outer surface having an outer circular cross section centered on the first axis of rotation;
without removing the rod from the first holder, machining an inner surface of the rod using a tool rotatably supported by the second holder to form a cylindrical inner surface having an inner circular cross section centered on the second axis of rotation;
without removing the rod from the first holder, holding the rod with the second holder and separating the machined portion of the rod from an unmachined portion of the rod to form a hollow roller of a roller bearing, and
wherein the rod has an axial end face, wherein the machining of an inner surface of the rod includes drilling into the axial end face of the rod, wherein the inner surface is machined over a distance from the axial end face of the rod, wherein the outer surface is machined over the distance from the axial end face of the rod to have a constant outer diameter and wherein the separating occurs at a location such that the hollow roller has a constant inner diameter.

7. The process according to claim 6, wherein the machining of the outer surface of the rod and the machining of the inner surface of the rod are performed such that the hollow roller has a hollowness rate above 78%.

8. The process according to claim 7, further including, after the separating of the machined portion of the rod from the unmachined portion of the rod,
grinding the outer cylindrical surface on a centerless machining equipment, or
grinding axial surfaces of the hollow roller, or
grinding connecting or corner radii between axial and radial surfaces of the hollow roller, or
grinding a draught zone or crown between the outer radial cylindrical surface and a zone including a connecting radius.

9. The process according to claim 7, wherein:
the machining of the outer surface of the rod is performed by a cutting insert, and
the machining of the inner surface of the rod is performed by a drill.

10. The process according to claim 7, wherein the first holder is a first chuck and wherein the second holder is a second chuck.

11. The process according to claim 7, wherein the machining of the inner surface of the rod is performed simultaneously with the machining of the outer surface of the rod.

12. The process according to claim 7, wherein the machining of the inner surface of the rod is performed after the machining of the outer surface of the rod.

13. The process according to claim 7, wherein the separating is performed at a location at which the inner surface of the rod has been machined.

14. The process according to claim 7, including installing the hollow roller and a plurality of roller elements between a bearing inner ring and an bearing outer ring to form a roller bearing.

15. The process according to claim 7, including installing the hollow roller and a plurality of roller elements between a bearing inner ring and an bearing outer ring to form a roller bearing.

16. A process comprising:
providing a lathe having a first holder having a first axis of rotation and a second holder facing the first holder and having a second axis of rotation;
placing a rod in the first holder and machining an outer surface of the rod to form a cylindrical outer surface having an outer circular cross section centered on the first axis of rotation;
without removing the rod from the first holder, machining an inner surface of the rod using a tool rotatably supported by the second holder to form a cylindrical inner surface having an inner circular cross section centered on the second axis of rotation;
without removing the rod from the first holder, holding the rod with the second holder and separating the machined portion of the rod from an unmachined portion of the rod to form a hollow roller of a roller bearing;
installing the hollow roller and a plurality of roller elements between a bearing inner ring and a bearing outer ring to form the roller bearing, and
wherein the rod has an axial end face, wherein the machining of an inner surface of the rod includes drilling into the axial end face of the rod, wherein the inner surface is machined over a distance from the axial end face of the rod, wherein the outer surface is machined over the distance from the axial end face of the rod to have a constant outer diameter and wherein the separating occurs at a location such that the hollow roller has a constant inner diameter.

17. The process according to claim 16, wherein the first axis of rotation is offset from the second axis of rotation by less than 2 μm and an inclination angle between the first axis of rotation and the second axis of rotation is less than one minute of angle.

* * * * *